United States Patent [19]

Cotton

[11] Patent Number: 5,364,680
[45] Date of Patent: Nov. 15, 1994

[54] PROCESS FOR SELECTIVELY ABSORBING OILY CONTAMINANTS

[75] Inventor: James D. Cotton, Marietta, Ga.
[73] Assignee: Kimberly-Clark Corporation, Neenah, Wis.
[21] Appl. No.: 43,643
[22] Filed: Apr. 6, 1993

Related U.S. Application Data

[62] Division of Ser. No. 920,968, Jul. 28, 1992, Pat. No. 5,281,463.
[51] Int. Cl.$^5$ .......................... B32B 3/06; C02F 1/28
[52] U.S. Cl. .................... 428/126; 428/137; 428/903; 428/913; 210/693; 405/63
[58] Field of Search .......... 428/126, 137, 903, 913; 405/63; 210/922, 923, 693

[56] References Cited

U.S. PATENT DOCUMENTS

| | | | |
|---|---|---|---|
| Re. 31,087 | 11/1982 | Sohl | 210/671 |
| Re. 31,885 | 5/1985 | Meitner | 252/91 |
| 705,523 | 7/1902 | Kranz | 210/40 |
| 3,146,192 | 8/1964 | McClintock | 210/40 |
| 3,147,216 | 9/1964 | Oomler | 210/40 |
| 3,184,923 | 5/1964 | Galvaing | 61/1 |
| 3,314,540 | 4/1967 | Lane | 210/77 |
| 3,382,170 | 5/1968 | Pape et al. | 210/36 |
| 3,426,902 | 2/1969 | Kilpert et al. | 210/179 |
| 3,464,920 | 9/1969 | Pirson et al. | 210/29 |
| 3,487,927 | 1/1970 | Yahnke | 210/30 |
| 3,539,013 | 11/1970 | Smith | 210/242 |
| 3,617,556 | 11/1971 | Cole | 210/30 |
| 3,667,608 | 6/1972 | Burroughs et al. | 210/242 |
| 3,700,593 | 10/1972 | Bezemer et al. | 210/40 |
| 3,764,527 | 10/1973 | Sohl | 210/30 |
| 3,904,528 | 9/1975 | Yocum | 210/242 |
| 4,102,789 | 7/1978 | Young | 210/252 AS |
| 4,908,026 | 3/1990 | Sukiennik et al. | 604/378 |
| 5,009,790 | 4/1991 | Bustamante et al. | 210/689 |
| 5,066,527 | 11/1991 | Newell | 428/35.6 |
| 5,078,890 | 1/1992 | Conche et al. | 210/691 |
| 5,087,152 | 2/1992 | Whidden | 405/68 |

FOREIGN PATENT DOCUMENTS

| | | | |
|---|---|---|---|
| 9180-209 | 7/1991 | Australia . | |
| 2433078 | 4/1980 | France . | |
| 1543836 | 4/1979 | Germany . | |
| 135895 | 6/1979 | Germany | C02C 5/02 |
| 979978 | 1/1965 | United Kingdom . | |

| | | |
|---|---|---|
| WO90/12923 | 11/1990 | WIPO . |

OTHER PUBLICATIONS

Database WPI, Section Ch, Week 8118, Derwent Publications Ltd., London, GB; Class J01, AN 81-31916D & SE-A-7 901 393 (Molnlycke AB) 16 Sep. 1980, Abstract.
"Defeating the Cornish Menace"-*Chemistry & Industry*-Apr. 22, 1967 p. 632.
"Combating Oil Pollution"-*Petroleum Times*-vol. 71, Apr. 28, 1967 pp. 620, 625-628.
"New Boom Absorbs Oil"-*Applied Plastics*-vol. 10, No. 6, Jun. 1967 p. 56.
Porter, L. E.; "Oil Pollution Is Still A Problem" The Dock and Harbour Authority-vol. 48, Jan. 1968.
"Two Method For Combatting Water Pollution" Plastica, 21 (Dec. 1968); pp. 24-25 and 3-6.
"Oil Spill Treating Agents A Compendium"May 1, 1970-pp. 116, 133-134; 150-153; 215-216.
The Institute of Petroleum; "Pollution Prevention"-Dec. 1968; pp. 136-139; 166-171.
"Clean Water"-Status Report-Use of Chemicals to Treat Oil On Water-Feb. 20, 1969; PB 215 084; pp. 1-20.
L. E. Preston Test Results Sep. 23, 1991.
A. S. Bell Test Results-Jul. 9, 1990.
"Comparative Efficacy of Commercially Available Polypropylene Boom" Dr. Schrader, Milsaps College, Environ. Geol. Water Sci., vol. 17, No. 2, Dec. 1991.
World Catalogue of Oil Spill Response Products Dec. 1991 Edition.

*Primary Examiner*—Alexander S. Thomas
*Attorney, Agent, or Firm*—William D. Herrick

[57] ABSTRACT

A structure for selectively absorbing an oily contaminant from an aqueous environment comprising a plurality of sheets of nonwoven oleophilic fibers arranged in superposition to form a generally rectangular parallelpiped shape, the configuration may be maintained in shape and has a major surface formed by sheet edges so that when contacting an oily containment, the contaminant is selectively absorbed into the structure through wicking action. These structures may be combined to form booms or the like and stacked in a particular configuration for easy storage, transportation and deployment.

8 Claims, 4 Drawing Sheets

PROCESS FOR SELECTIVELY ABSORBING OILY CONTAMINANTS

This is a divisional application of application Ser. No. 07/920,968, filed on Jul. 28, 1992 now U.S. Pat. No. 5,281,463.

BACKGROUND OF THE INVENTION

This invention relates to methods and means for selectively absorbing oily contaminants. One aspect is the clean-up of water borne oil spills from our rivers, lakes, seas, oceans, other bodies of water and shores.

For many years oil spills have presented a difficult and costly clean-up problem. Such spills are not only harmful to aquatic life but, when washed ashore, can render beaches unusable with disastrous consequences for recreation and various enterprises dependent thereon. A great number of solutions have been proposed from containment booms, to collection devices to dispersants and even biological ingestion. Various nonwoven fabrics made from thermoplastic oleophilic fibers have been suggested as useful for absorbing oil in preference to water and achieving separation and/or containment of oil spills. In addition, such fabrics have been formed into or included as oil booms intended to surround and prevent the spread of oil slicks.

In spite of the foregoing, the problems of oil spills persist and efficient and effective methods and means for removing and avoiding the spread of such oily contaminants are still highly desired.

SUMMARY OF THE INVENTION

In response to the foregoing discussed difficulties and problems, a new structure for selectively absorbing oily contaminants from an aqueous environment has been developed. The structure includes a plurality of sheets of oleophilic and hydrophobic nonwoven thermoplastic fibers or filaments arranged in superposition or in a stack to form a layered structure, preferably of a generally rectangular parallelpiped shape. Means for maintaining these sheets such as a compression core are also included so that a major surface of the layered or parallelpiped shape consists of raw or folded sheet edges. This surface is equal to or greater than the other surfaces of the layered shape. When deployed in connection with an oil spill, several of these structures may be linked by means of a rope or the like through a hole formed in the stack and to thereby present an integral boom of any desired length. Once the structures are linked and the integral boom is deployed in front of an advancing oil slick, or around a slick, the preferred embodiment is an arrangement wherein the sheet edges contact the oil first. These structures may also be combined and stacked for easy storage and transportation and can contain a core and end caps through which the rope may be easily fed. When stacked in accordance with a preferred embodiment, deployment is simplified as is retrieval. Particularly when spunbond nonwoven sheets are used having an average filament diameter in the range of from about 10 to about 40 microns per filament and a basis weight in the range of from about 0.4 osy to 4 osy (14 gsm to 140 gsm) formed into a continuous web folded in a serpentine manner, a very effective boom or absorbent structure may be obtained. In a particularly advantageous application, the pore size of the nonwoven material is controlled by perforation or the like to provide macropores ranging from about 0.5 mm to 6.35 mm, for example, for capture of oily contaminants of widely varying viscosity and form, For certain applications, higher capacity may be achieved, if desired, by using a meltblown web as the internal portion of the layered structure. The finer pores and capillaries of the meltblown web will more aggressively attract and hold the oily contaminants, especially those of the lowest viscosities.

DETAILED DESCRIPTION OF THE PRESENT INVENTION

Nonwoven polymeric fabrics from oleophilic thermoplastic fibers are commonly made by meltspinning thermoplastic materials. Preferred fabrics for use in accordance with the present invention are formed by a process commonly referred to as "spunbonding". Such methods are well-known and described, for example, in U.S. Pat. No. 4,692,618 to Dorschner et al. and U.S. Pat. No. 4,340,563 to Appel et al. Molten thermoplastics are extruded through a spinneret and drawn into filaments with a stream of high velocity air to form a substantially random web on a collecting surface. For example, U.S. Pat. No. 3,692,618 to Dorschner et al. discloses a process wherein bundles of polymeric filaments are drawn with a plurality of eductive guns by very high speed air. U.S. Pat. No. 4,340,563 to Appel et al. discloses a process where thermoplastic filaments are drawn through a single wide nozzle by a stream of high velocity air. Other patents also disclose typical meltspinning processes: U.S. Pat. No. 3,338,992 to Kinney; U.S. Pat. No. 3,341,394 to Kinney; U.S. Pat. No. 3,502,538 to Levy; U.S. Pat. No. 3,502,763 to Hartmann: U.S. Pat. No. 3,909,009 to Hartmann; U.S. Pat. No. 3,542,615 to Dobo et al.; and Canadian Patent 803714 to Harmon.

Another process traditionally referred to as "meltblowing" involves extruding streams of thermoplastic molten polymer into opposing blasts of heated air which causes the formation of fine microfibers. While these fibers have been described as "discontinuous", the length to diameter ratio approaches infinity, and others have described them as essentially continuous. These fibers are also collected on a carrier as a web of fibers with very fine pore structures which are advantageous for certain applications of the present invention. Such meltblown webs and methods for making them are described, for example, in U.S. Pat. No. 3,849,241 to Buntin et al.

A preferred nonwoven for use in connection with the present invention is a spunbond nonwoven bonded by a patterned application of heat and pressure. While the bond pattern may vary depending upon the particular balance of properties desired, such as tensile strength, porosity, and bulk, bond patterns having an array of bond points to provide a per cent bond area within the range of up to about 30% and, preferably up to about 15% have been found useful. The number of bond points may vary as well from a minimum of about 10 per square centimeter so long as adequate strength and absorbency properties are obtained. Other bonding means may be employed such as ultrasonics, through-air bonding and adhesives as will be apparent to those skilled in the art.

For less viscous oils meltblown microfiber webs may be advantageous in combination with stronger material such as a spunbond web. These meltblown webs are generally of finer fibers which are thermally bonded at fiber intersections as formed. This results in a generally more bulky web having a density, for example, in the range of from about 0.040 g/cc to 0.130 g/cc with a range of from about 0.05 g/cc to about 0.075 g/cc preferred. Other bonding means may be used such as those mentioned above if desired, but the thermal bonds inherent in the meltblowing process are adequate for purposes of the present invention and result in desirable porosity and absorbency properties especially for low viscosity oils For example, test products NASB and PASB one ounce per square yard have a bond area of 25%, whereas product PASB 0.8 ounce per square yard has a bond area of 16% Comparison of absorbency rates and capacities in the oils demonstrated that as the bond area decreases, absorbency rates and capacities tend to increase. However, even unbonded webs can be utilized provided that they are incorporated in the structure between sheets of bonded nonwoven web.

While not preferred, it will be apparent to those skilled in this art that webs formed by other processes may be used as well such as bonded carded webs, for example. The advantages of both spunbond and meltblown webs may be obtained in an embodiment where sheets of meltblown are interleaved between sheets of spunbond either as individual sheets or interfolded continuous webs. Also, webs formed from mixtures of fibers such as staple fiber coformed webs described in U.S. Pat. No. 4,587,154 to Hotchkiss et al. may be used as well as laminates such as described in U.S. Pat. No. 4,041,203 to Brock et al. Other properties of preferred webs generally include a basis weight in the range of from about 14 gsm to 140 gsm, tensile strength in the range of from about 1 to 50 lbs., (about 0.5 Kg-M-F to about 23 Kg-M-F) filament diameter in the range of from about 10 to 40 microns, and formed as a continuous web of width in the range of from about 10 inches to about 60 inches folded in a serpentine manner.

Polymers useful in accordance with the present invention include those thermoplastics that are or which may be made oleophilic, for example, polyolefins such as polypropylene, polyethylene, and blends and copolymers alone or in admixture with other fibers. Preferred polymers are highly hydrophobic to avoid undesired absorption of water in use.

The shape of the layered structure of the present invention is not critical so long as it has one or more surfaces comprising panel sheet edges and/or folds and at least one of these surfaces is as large or larger than any other surface of the structure. When exposed to use conditions, oil to be absorbed contacts edges, or folds or ends of the sheet or sheets. In other words, the stack is not disposed so that the flat panel sheet surface rests on the oil or water surface. For practical purposes this is best achieved when the layered structure is a rectangular parallelpiped in shape and when folds or sheet edges comprise a surface at least as large as any other surface of the structure.

The use of the term "rectangular parallelpiped" herein means a structure that is generally six sided with each side generally in the shape of either a square or rectangle. It will be recognized that, since the structure consists of a series of sheets, this shape will be subject to modification during forming, storage or use, but will generally resemble its original form. In a preferred embodiment as described below, a compression core centrally located through the structure and the use of end caps result in fanning of the sheets in use which will tend to produce a more elliptical shape and permit easier access by the oil to the interior of the structure. The compression produced by the core in combination with end caps may vary but will be sufficient to retain the general shape of the structure. For example, a 22 inch stack as produced may be compressed to 20 inches. For sweeping type applications often useful on still waters, it may be desirable to locate the compression core off-center to resist rotational forces on the structure from the sweeping action. In use, if the structure surfaces are not equal, at least one larger surface will comprise sheet edges or folds so that, when deployed, the structure will tend to rest on the edges or folds of the sheets.

As used herein the term "boom" refers to an elongated structure which may include a plurality of absorbent structures of the present invention in one or more catenated strings through the cores adapted to be deployed along a line, for example, to contain an oil spill.

Figure 1:
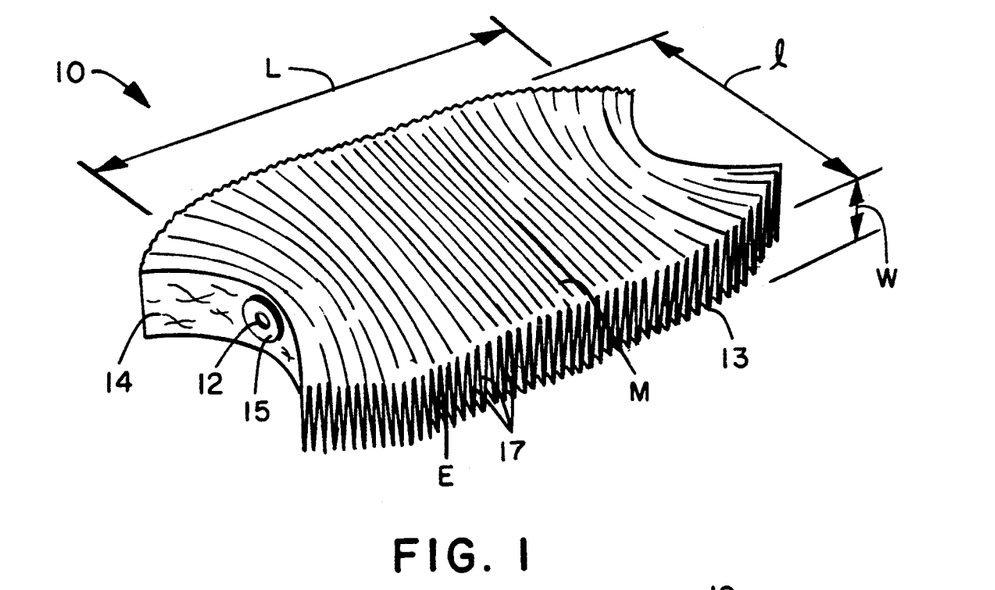
FIG. 1 is a perspective view of one absorbent structure element of the present invention.

Turning to FIG. 1, the present invention is illustrated as oil absorbent parallelpiped structure 10 having an overall length L, for example, of 20 inches, an individual sheet length, l, of 20 inches, for example, and an individual sheet width of 4¼ inches, for example. Core 12 is centrally located and extends through the structure for receiving a rope or other means for combining with other absorbent structures. Preferably core 12 is formed of polypropylene for compatibility in floating and incineration properties and is removable for ease of squeezing oil out of the structure. As shown, for example, the rectangular parallelpiped shape has a major surface M that comprises edges 13 of sheet panel 14 and surface E comprising ends 17 of sheet panel 14. While each panel 14 may be separate, it is preferred that the individual panels be connected and folded in a serpentine manner as illustrated to form the absorbent structure 10.

Figure 2:
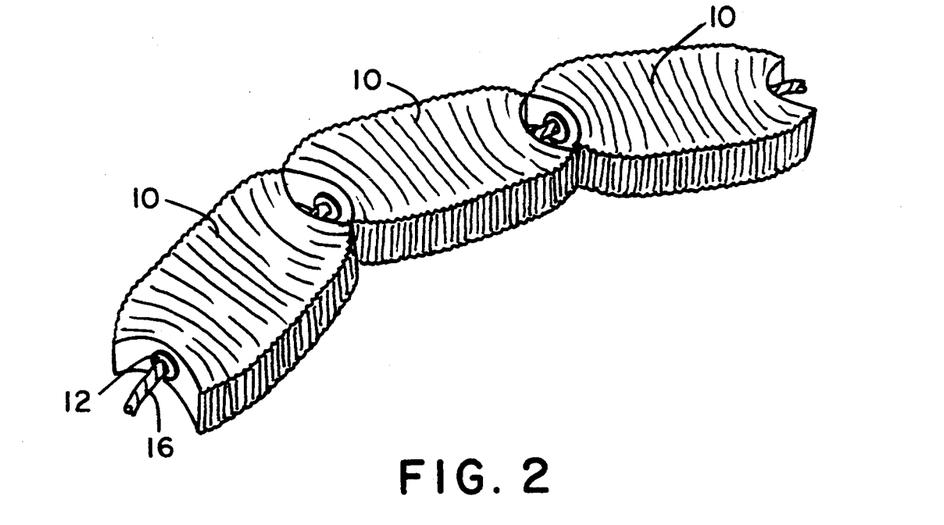
FIG. 2 is a similar view showing several absorbent structures of the present invention combined as a segment of a boom.

Turning to FIG. 2, several absorbent structures 10 are shown combined using rope 16 through cores 12. As shown, the spacing between the structures in combination with the effect of the compression cores result in flaring of the edges of the sheets so that an essentially continuous line of absorbent material is formed. This is highly preferred for barrier applications. The preferred rope is Wall Industries, dielectric polypropylene rope such as Wall Industries Super T&D to minimize spark generation during deployment or retrieval. Also this particular rope allows only 15% stretch before breaking. This maximum amount of stretch allows individual structures to fan out, but not beyond the point where the extremities of the fanned edges will not have contact with adjoining structures so that an essentially continuous barrier is formed.

Figure 3:
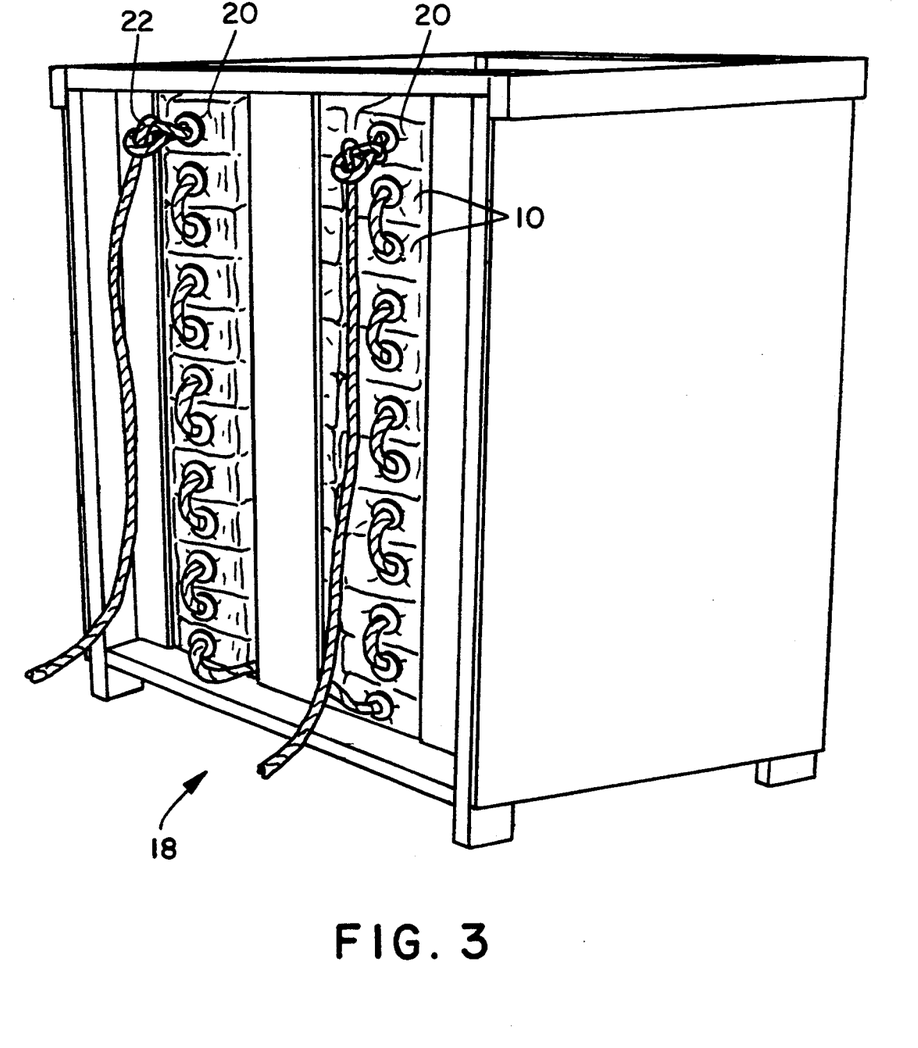
FIG. 3 is a perspective of a pallet containing one arrangement of a boom arranged for storage and rapid deployment.

Turning to FIG. 3, a pallet 18 is shown containing a pair of stacks 20 of absorbent structures 10 connected by rope 16 having end knots 22 and is in a convenient form for storage or transportation.

Figure 4:
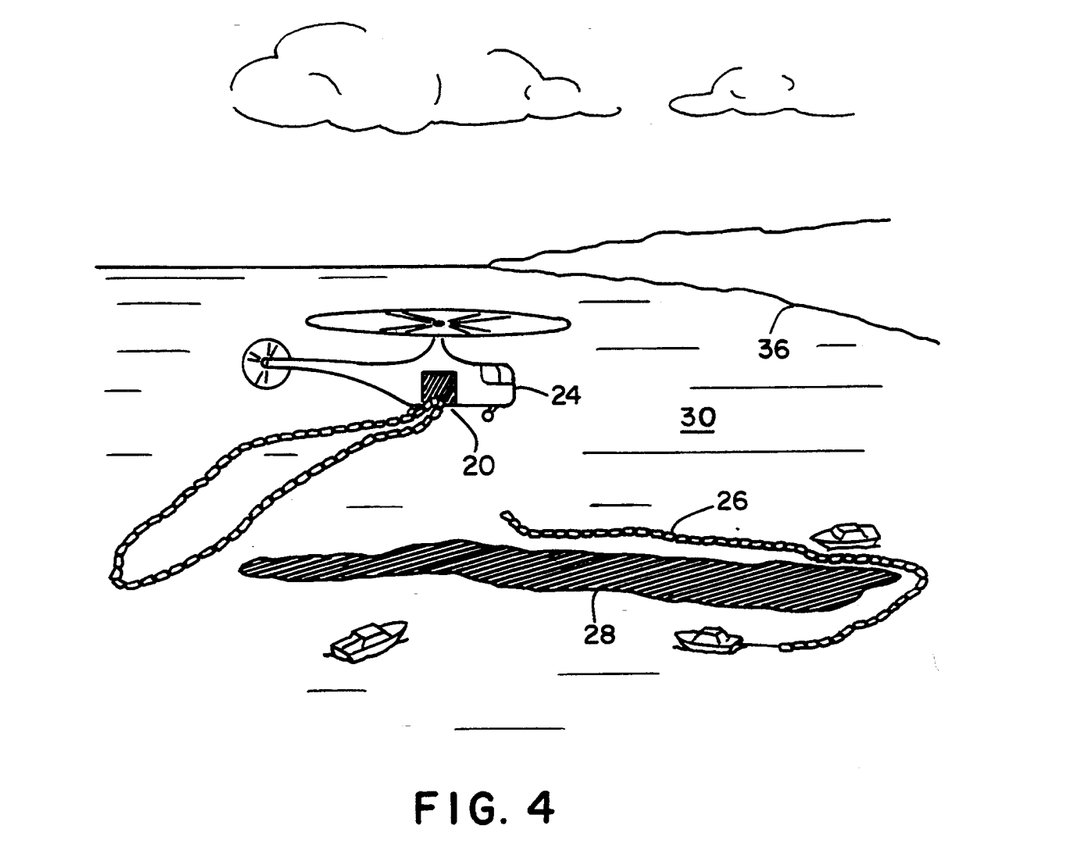
FIG. 4 illustrates an aircraft deployment of a boom in accordance with the present invention.

Turning to FIG. 4, one means of air deployment is shown using aircraft such as helicopter 24 from which stacks 20 are dropped and combined with other stacks to form booms 26 surrounding slick 28 in lake 30. Boats located adjacent the drop area can be used to move the booms into a desired configuration.

Figure 5:
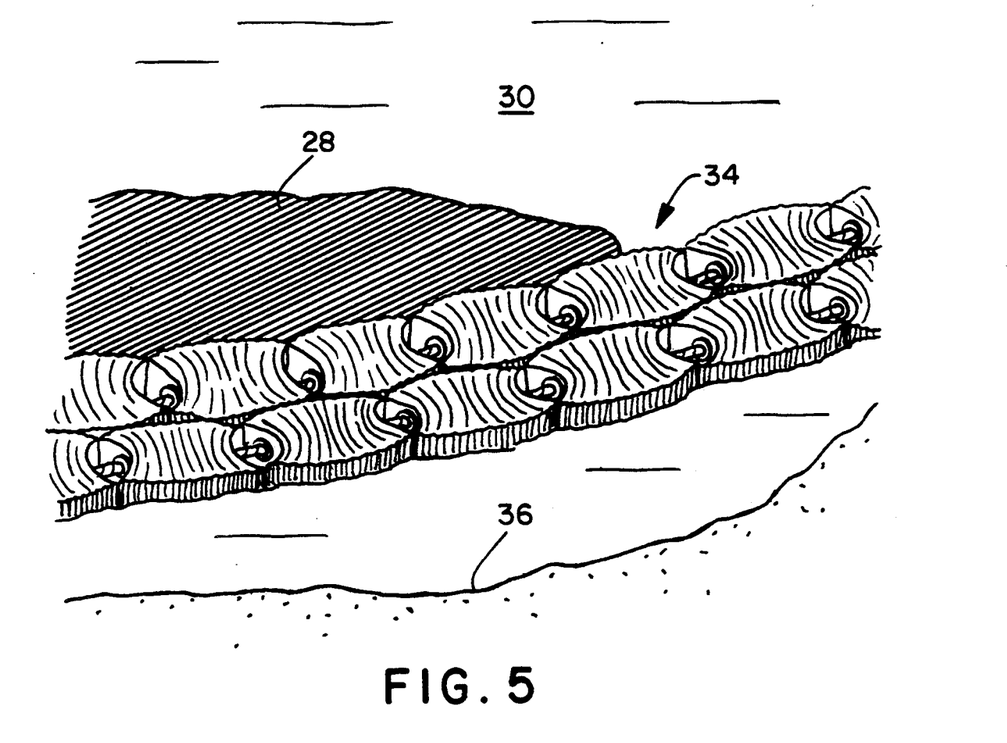
FIG. 5 is a more detailed illustration of a boom structure in place in accordance with the present invention.

Turning to FIG. 5, the absorbent structures of the present invention are shown deployed in body of water 30 as bulkhead 34 to protect shoreline 36.

EXAMPLES

For purposes of illustrating the present invention several materials were utilized in the following examples. Pin apertured spunbond ("PASB") is a spunbond polypropylene nonwoven manufactured by Kimberly-Clark Corporation under the designation 0.8 osy Non-wettable Spunbond, 16% bond area, that is further processed in accordance with the teachings of U.S. Pat. No. 4,886,632 to Van Iten et al., incorporated herein by reference, except that the pins of the aperturing roll were not heated. While the term "apertures" is used for convenience, those skilled in the art will appreciate that precise holes are not necessarily formed but rather, fibers are redistributed so that the web density is very low within the "aperture" areas. This material had a bond pattern as illustrated in U.S. Pat. No. 239,566 to Vogt with 16% bond area and 25 bonds per square centimeter. Where indicated a spunbond nonwoven available from Corovin GmbH under the designation Corovin Industrial Spunbond having a square bond pattern of 25% bond area and 30 bonds per square centimeter was used. Similar spunbond webs without processing as described in Van Iten et al., U.S. Pat. No. 4,886,632 were also tested ("NASB"). Meltblown webs prepared as described in U.S. Pat. No. 3,849,241 to Buntin et al. and subjected to further processing in the same manner as the above described spunbond webs were also tested ("PAMB"). In some cases such meltblown webs without further processing were also tested ("NAMB"). All webs were polypropylene and of a basis weight of 1 osy unless otherwise indicated.

Test oils with a wide range of viscosities were used to simulate a variety of oil spill conditions.

Diesel Oil #2—80 centipoises (mPa/s)
Saudi Light Crude—125 centipoises (mPa/s)
T-102 Domestic Crude—200 centipoises (mPa/s)
T-201 Domestic Crude—18,600 centipoises (mPa/s)

The first series of tests was designed to illustrate the effect of insult orientation on absorbent capacity with respect to various oils. Cubes were formed having a 4.24 inch side dimension and contacted with the test oils in three different orientations. The first resulted in insult to the sheet edges ("Straight"), the second to the flat sheet surface ("Flat"), the third to the folded sheet edges ("Folded"). Results obtained in these and subsequent tests are based on laboratory conditions, and is believed that even greater improvements may be obtained with structures made for full scale applications. The test matrix was as follows:

| BOTTOM INSULT ORIENTATION CAPACITY TESTING CUBOID TESTING MATRIX I | | | |
|---|---|---|---|
| | ORIENTATION | | |
| MATERIAL | FLAT | FOLDED | STRAIGHT |
| PASB | DIESEL | DIESEL | DIESEL |
| | T-201 | T-201 | T-201 |
| | SAUDI LT. | SAUDI LT. | SAUDI LT. |
| NASB | DIESEL | DIESEL | DIESEL |
| | T-201 | T-201 | T-201 |
| | SAUDI LT. | SAUDI LT. | SAUDI LT. |
| PAMB | DIESEL | DIESEL | DIESEL |
| | T-201 | T-201 | T-201 |
| | SAUDI LT. | SAUDI LT. | SAUDI LT. |
| NAMB | DIESEL | DIESEL | DIESEL |
| | T-201 | T-201 | T-201 |
| | SAUDI LT. | SAUDI LT. | SAUDI LT. |

Capacity testing was carried out in accordance with the following protocol:

| | |
|---|---|
| Materials Required: | Tub type container (11.25 × 13.25 × 5.75 inches) |
| | Four rubber stoppers (>0.5 inches height) |
| | Diesel oil |
| | T-201 oil |
| | T-102 oil |
| | Fabric samples (4.25 × 4.25 × 4.25 inches) |
| | Plexiglass Box - a hollow plexiglass box (4.25 × 4.25 × 4.25 inch, I.D.,) box was utilized for holding fabric samples during insult exposure in this procedure. The plexiglass box has a 4 × 4 inch opening in the bottom box surface and a hinged lid on the top surface to allow placement and retrieval of material samples. |
| | Balance (specific to the .00 g) |
| | Timer |
| | Aluminum Pan for weighing samples |
| Procedure: | Add one half inch of water (70–75° F.) into plastic tub |
| | Place four rubber stoppers into water configured to support the plexiglass box test apparatus. Water level must be below the top of the rubber stoppers. |
| | Add one inch of oil insult. Do not proceed until oil is settled onto top of water surface. |
| | Measure and record the weight of sorbent cube being tested. Materials acceptable weight range in 89–90 grams. |
| | Clean and dry both weighing pan and box. |
| | Measure and record the weight of pan, box and sample. |
| | Place fabric cube in desired orientation in test box. |
| | Place box, insult side down, into the oil. Position test box so that four corners rest on rubber stoppers placed in tub in step 2. Allow soak for ten minutes |
| | Remove box and allow to drain for one minute. |
| | Clean all fluid from exterior of box and place in pan. Measure and record weight of sample, pan and box. |
| | Subtract the dry weight of sample, pan and box from the saturated weight of sample, pan and box to determine the amount of fluid absorbed. |
| | Divide weight of total fluid absorbed by the initial weight of the sorbent cube to determine the ratio of grams of fluid absorbed per gram of sorbent (g/g). |

The g/g absorbency test results are shown below.

10 Minute Test

Sorbent Specification: PASB
Insult Orientation

| Medium - | FLAT | FOLDED | STRAIGHT |
|---|---|---|---|
| Diesel | 3.935 | 3.35 | 3.22 |
| T-102 | 3.105 | 2.33 | 3.035 |
| T-201 | 0.38 | 0.83 | 1.265 |

Sorbent Specification: NASB
Insult Orientation

| Medium - | FLAT | FOLDED | STRAIGHT |
|---|---|---|---|
| Diesel | 3.565 | 2.88 | 3.175 |
| T-102 | 2.705 | 2.155 | 3.35 |
| T-201 | 0.39 | 0.795 | 1.01 |

Sorbent Specification: PAMB
Insult Orientation

| Medium - | FLAT | FOLDED | STRAIGHT |
|---|---|---|---|
| Diesel | 3.70 | 4.245 | 3.86 |
| T-102 | 0.455 | 0.63 | 1.70 |
| T-201 | 0.365 | 0.67 | 0.695 |

As can be seen, particularly for heavy oils, the insult orientation, both edge and folded edge, results in much higher absorbent capacity. While it is not intended to limit the invention to any particular theory it is believed that this occurs because the space provided between straight and folded edges provides a horizontal panel space gradient to the inner structure for viscous oils that are not readily adsorbed into the average pore sizes of the disclosed nonwoven webs. This is particularly advantageous where an oil spill involves heavy oil or where oil has congealed.

The next series of tests measured the effect of insult orientation on absorbency rate using the same test cubes and the test matrix set forth below:

BOTTOM INSULT ORIENTATION RATE TESTING CUBOID TESTING MATRIX II

| MATERIAL | ORIENTATION | | |
|---|---|---|---|
| | FLAT | FOLDED | STRAIGHT |
| PASB | DIESEL | DIESEL | DIESEL |
| | T-201 | T-201 | T-201 |
| NASB | DIESEL | DIESEL | DIESEL |
| | T-201 | T-201 | T-201 |
| PAMB | DIESEL | DIESEL | DIESEL |
| | T-201 | T-201 | T-201 |
| NAMB | DIESEL | DIESEL | DIESEL |
| | T-201 | T-201 | T-201 |

The test protocol was as follows:
Same as above for Matrix I except that testing was repeated for oil exposure times of two and one-half, five and seven and one-half minutes.

The test results are shown below:

RATE TESTS
T-201
18,600 Centipoises (mPa/s)

Sorbent Specification: PASB
Insult Orientation

| Duration - | FLAT | FOLDED | STRAIGHT |
|---|---|---|---|
| 2.5 min. | 0.280 | 0.600 | 0.665 |
| 5.0 min. | 0.410 | 0.815 | 0.850 |
| 7.5 min. | 0.545 | 0.805 | 0.935 |

Sorbent Specification: NASB
Insult Orientation

| Duration - | FLAT | FOLDED | STRAIGHT |
|---|---|---|---|
| 2.5 min. | 0.245 | 0.340 | 0.715 |
| 5.0 min. | 0.260 | 0.420 | 0.940 |
| 7.5 min. | 0.350 | 0.490 | 0.915 |

Sorbent Specification: PAMB
Insult Orientation

| Duration - | FLAT | FOLDED | STRAIGHT |
|---|---|---|---|
| 2.5 min. | 0.245 | 0.365 | 0.495 |
| 5.0 min. | 0.300 | 0.360 | 0.645 |
| 7.5 min. | 0.330 | 0.520 | 1.075 |

RATE TESTS
Standard #2 Diesel
80 Centipoises (mPa/s)

Sorbent Specification: PASB
Insult Orientation

| Duration - | FLAT | FOLDED | STRAIGHT |
|---|---|---|---|
| 2.5 min | 2.75 | 2.55 | 2.42 |
| 5.0 min. | 3.25 | 2.705 | 2.95 |
| 7.5 min. | 3.425 | 2.775 | 3.08 |

Sorbent Specification: NASB
Insult Orientation

| Duration - | FLAT | FOLDED | STRAIGHT |
|---|---|---|---|
| 2.5 min. | 2.475 | 2.095 | 2.19 |
| 5.0 min. | 3.23 | 2.45 | 2.65 |
| 7.5 min. | 3.44 | 2.745 | 2.605 |

Sorbent Specification: PAMB
Insult Orientation

| Duration - | FLAT | FOLDED | STRAIGHT |
|---|---|---|---|
| 2.5 min. | 2.17 | 2.56 | 2.27 |
| 5.0 min. | 3.015 | 3.025 | 2.965 |
| 7.5 min. | 3.525 | 3.795 | 3.675 |

Sorbent Specification: NAMB
Insult Orientation

| Duration - | FLAT | FOLDED | STRAIGHT |
|---|---|---|---|
| 2.5 min. | 2.30 | 2.345 | 2.59 |
| 5.0 min. | 2.33 | 3.33 | 3.41 |
| 7.5 min. | 3.36 | 3.905 | 3.96 |

Again, for the heavier oils, the structure of the present invention provides highly advantageous results. Also, the data suggest that this structure made with meltblown fibers provides improved results with oils near the viscosity of diesel. While it is not intended to limit the invention to any particular theory, it is believed this occurs for the reasons discussed above. Since this improves ability to reduce oil spills spreading, this effect is highly desired.

The next series of tests measures the effect when the insult approaches from the side, closely simulating actual use.

The test protocol was as follows: Same as for the previous tests except that an opened top plexiglass box with bottom internal dimensions of 14.25 inches × 17 inches. The box was divided longitudinally into two 5 inch chambers on the sides and a 4¼ inch × 17 inch chamber down the center. The 4¼ inch × 17 inch chamber was further subdivided into four, 4¼ inch chambers. The sides of the 4¼ inch chamber adjoining the 5 inch chambers were open to accept liquids.

The procedure was as follows:
Add one inch of water (70°-75° F.) into plexiglass test apparatus. Water must reach at least one inch above the bottom edge of test material.
Measure and record the weight of sorbent cube being tested. Materials acceptable weight range is 89-90 grams.
Clean and dry aluminum weighing pan.

Measure and record the weight of pan and sample.

Place fabric cube in desired orientation in the test apparatus. Record the samples number and material description of each fabric cube being evaluated (1–4).

Add two inches of oil to the righthand test well and allow to soak for ten minutes.

Remove test materials, at the same time and allow to drain for one minute.

Place each sample into a weighing pan. Measure and record the weight of sample and pan.

Subtract the dry weight of sample and pan from the wet weight of sample and pan to determine the amount of fluid adsorbed.

Divide weight of total fluid adsorbed by the initial weight of the sorbent cube to determine the ratio of grams of fluid adsorbed per gram of sorbent.

The test results were as follows:

SIDE INSULT ORIENTATION TESTS
T-102
200 Centipoises (mPa/s)

| Sorbent Specification: | PASB Insult Orientation | | |
|---|---|---|---|
| Duration - | FLAT | FOLDED | STRAIGHT |
| 2.5 min. | 1.00 | 1.77 | 1.90 |
| 7.5 min. | 2.35 | 3.10 | 3.58 |

| Sorbent Specification: | NASB | | |
|---|---|---|---|
| | FLAT | FOLDED | STRAIGHT |
| 2.5 min. | 0.72 | 1.08 | 1.91 |
| 7.5 min. | 1.75 | 2.67 | 3.27 |

| Sorbent Specification | PAMB | | |
|---|---|---|---|
| | FLAT | FOLDED | STRAIGHT |
| 2.5 min. | 0.28 | 0.35 | 1.01 |
| 7.5 min. | 1.17 | 0.62 | 2.02 |

| Sorbent Specification: | NAMB | | |
|---|---|---|---|
| | FLAT | FOLDED | STRAIGHT |
| 2.5 min. | 0.18 | 0.37 | 1.16 |
| 7.5 min. | 0.44 | 0.48 | 1.81 |

SIDE INSULT ORIETATION TEST
T - 201
18,600 Centipoises (mPa/s)

| Sorbent Specification Duration - | PASB Insult Orientation | | |
|---|---|---|---|
| | FLAT | FOLDED | STRAIGHT |
| 2.5 min | 0.15 | 0.20 | 0.61 |
| 7.5 min | 0.45 | 0.46 | 0.72 |

| Sorbent Specification | NASB | | |
|---|---|---|---|
| | FLAT | FOLDED | STRAIGHT |
| 2.5 min | 0.15 | 0.08 | 0.47 |
| 7.5 min. | 0.30 | 0.26 | 0.69 |

| Sorbent Specification | PAMB | | |
|---|---|---|---|
| | FLAT | FOLDED | STRAIGHT |
| 2.5 min | 0.14 | 0.13 | 0.34 |
| 7.5 min. | 0.19 | 0.15 | 0.65 |

| Sorbent Specification: | NAMB | | |
|---|---|---|---|
| | FLAT | FOLDED | STRAIGHT |
| 2.5 min | 0.14 | 0.09 | 0.22 |
| 7.5 min | 0.21 | 0.18 | 0.33 |

These results demonstrate that straight edge orientation to the oil provides significant increases in absorbency rate and capacity.

This is advantageous because quickly immobilizing oil spreading on water reduces the risk of environmental damage. While it is not intended to limit the invention to any particular theory, it is believed this occurs because straight edges oriented to the insult allow unimpeded access to the surfaces of both sides of the superpositioned sheets where adsorption occurs.

The next series of tests illustrates larger scale applications using a 1 osy spunbond, Corovin Industrial Spunbond from Corovin GmbH and Kimberly-Clark 0.8 osy Nonwettable Spunbond in accordance with the following test matrix:

PRODUCT COMPARISON TESTING MATRIX III

| | PRODUCT FORM | |
|---|---|---|
| MATERIAL | 10 FOOT | 10 LBS |
| PASB 1.0 OSY | DIESEL T-201 SAUDI LT. | DIESEL T-201 SAUDI LT. |
| NASB 1.0 OSY | DIESEL T-201 SAUDI LT. | DIESEL T-201 SAUDI LT. |
| PASB 0.8 OSY | DIESEL T-201 SAUDI LT. | DIESEL T-201 SAUDI LT. |
| NASB 0.8 OSY | DIESEL T-201 SAUDI LT. | DIESEL T-201 SAUDI LT. |

Note: Pin aperturing of the 1 osy spunbond was not entirely successful, and the results shown are not believed fully representative.

In addition, a direct comparison was made to three commercially available oleophilic sorbent booms manufactured by 3M, Ergon Inc. and Sorbent Products Company. All booms were 10 feet long, 8 inches in diameter and weighed nominally 10 lbs.

The products were tested based on ten pounds of absorbent and ten feet of absorbent. The protocol for these tests was as follows:

| Materials Required: | 300 gallon round tub (plastic) 100 gallon oval tub (plastic) Pulley system to lower and lift samples Balance (specific to the 0.01-g) Timer Container for weighing (size to support largest saturated product to be evaluated. |
|---|---|
| Test Samples: | Products conformed to a 10 lb. units or 10 ft. lengths as necessary per evaluation. |
| Procedure: | Fill tub two-thirds full with fresh water (100 gallon oval tub for 10 lb. test and 300 gallon round tub for 10 ft. test.) Water must be regulated between 70-75° F. for testing. 10 gallons of oil is added to the fresh water tub. The dry sample weight is measured and recorded including the weight of the polypropylene, extrusion molded core and end caps. Clean and dry the weighing container. Measure and record the weight of the dry weighing container. The boom is placed evenly and horizontally into the tub and allowed to absorb for 2.5 minutes. At exactly 2.5 minutes, the sample is removed using the pulley system and allowed to drain for 5 seconds. (Sample is not to be tilted as this will cause an uneven distribution of the oil in the boom and effect the weight and drainoff). Measure and record the weight of wt. container and insult exposed sample. Subtract the dry weight of the sample |

-continued and wt. container from the weight of
sample and wt. container after insult
exposed (2.5 minutes). Divide weight
of total fluid absorbed by the
initial weight of the sorbent sample
to determine the ratio of grams of
fluid absorbed per gram of sorbent.
Repeat procedure with a 20 gallon oil
volume and a 30 minute exposure time.

The results of these tests were as follows:

10 Lb. Tests
Saudi Light - 125 Centipoises

2½ min
Total Ads LB of oil/Lb of sorbent

| | | |
|---|---|---|
| NASB 1.0 oz. | 35.2 | 3.52 |
| *PASB 1.0 oz. | 40.4 | 4.04 |
| PASB .8 oz. | 62.7 | 6.27 |
| Ergon | 48.8 | 4.88 |
| 3M | 36.5 | 3.65 |
| SPC | 39.5 | 3.95 |

30 min
Total Ads LB of oil/Lb of sorbent

| | | |
|---|---|---|
| NASB 1.0 oz. | 55.0 | 5.50 |
| *PASB 1.0 oz. | 74.8 | 7.48 |
| PASB .8 oz. | 80.6 | 8.06 |
| Ergon | 84.4 | 8.44 |
| 3M | 85.5 | 8.55 |
| SPC | 39.5 | 3.95 |

T-201 - 18,600 Centipoises

2½ min
Total Ads LB of oil/Lb of sorbent

| | | |
|---|---|---|
| NASB 1.0 oz. | 15.2 | 1.52 |
| *PASB 1.0 oz. | 17.9 | 1.79 |
| PASB .8 oz. | 28.0 | 2.80 |
| Ergon | 20.8 | 2.08 |
| 3M | 15.4 | 1.54 |
| SPC | 17.2 | 1.72 |

30 min
Total Ads LB of oil/Lb of sorbent

| | | |
|---|---|---|
| NASB 1.0 oz. | 24.0 | 2.40 |
| *PASB 1.0 oz. | 33.3 | 3.33 |
| PASB .8 oz. | 36.0 | 3.60 |
| Ergon | 37.5 | 3.75 |
| 3M | 38.2 | 3.82 |
| SPC | 29.1 | 2.91 |

10 Ft. Tests
30 min. Saturation
Saudi Light - 125 Centipoises

| | Weight | Total Ads. Lbs of oil/Lb of sorbent |
|---|---|---|
| NASB 1.0 oz. | 25 lbs | 132.0 | 5.28 |
| *PASB 1.0 oz. | 30 lbs | 215.5 | 7.18 |
| PASB 0.8 oz | 20 lbs | 158.0 | 8.06 |

*Aperturing not fully achieved.

These data show that 10 lbs. of parallelpiped structured web has a faster absorbency rate than 10 lbs. of commercially available absorbent products for high and low viscosity oils. Again, to mitigate that threat of oil spreading on water, faster immobilization of oil is essential. For example, 10 feet of several structures of the present invention have a capacity at 30 minutes exposure, of up to 215 lbs. of oil versus commercially available products which have about 85 lbs. Higher capacity combined with fast initial oil pickup is desirable to minimize the risk of environmental damage.

The next series of tests using the equipment described for the preceding tests demonstrated barrier properties of larger scale structures of the present invention. The test protocol was as follows:

| Test Samples: | 20 inch long samples |
|---|---|
| Procedure: | Fill tub two-thirds full with fresh water (100 gallon tub). Water must be regulated between 70-75° F. for testing. The dry sample weight is measured and recorded including the weight of the polypropylene, extrusion molded core and end caps. Clean and dry the weighing container. Measure and record the weight of the dry weighing container. The sample boom is placed evenly and horizontally into the tub of water with the ends secured. 2.5 gallons of water were added to the right side of the floating sample. At exactly 30 minutes, the sample is removed using the pulley system and allowed to drain for 5 seconds. (Sample is not to be tilted as this will cause an uneven distribution of the oil in the boom and effect the weight and drainoff). Measure and record the weight of wt. container and insult exposed sample. Subtract the dry weight of the sample and wt. container from the weight of sample and wt. container after insult exposed (2.5 minutes). Divide weight of total fluid absorbed by the initial weight of the sorbent sample to determine the ratio of grams of fluid absorbed per gram of sorbent. |

The results of the tests were as follows:

1 Block Barrier Tests
Saudi Light (2½ gallons) - 125 Centipoises
30 minutes

PASB 0.8 oz.

| Wt. of Sorbents | Total Oil Ads | Lbs./Lb |
|---|---|---|
| 4 lbs | 17 lbs | 4.25 |

NASB 1.0 oz.

| Wt. of Sorbents | Total Oil Ads | Lbs./Lb |
|---|---|---|
| 8 lbs | 16.5 lbs | 2.06 |

**\*PASB 1.0 oz.**

| Wt. of Sorbents | Total Oil Ads | Lbs./Lb |
|---|---|---|
| 8 lbs | 12 lbs | 2.00 |

*Pin-aperturing not fully achieved.

In all cases no oil penetrated the barrier as evidenced by the absence of sheen on the water opposite the insult. This result is of great significance to the ability to provide a complete barrier and protect vital shores and contain spills.

While the invention has been described in detail with respect to specific embodiments thereof, it will be appreciated that those skilled in the art, upon obtaining an understanding of the foregoing, may readily conceive of alterations to, variations of and equivalents to these embodiments. Accordingly, the scope of the present invention should be assessed as that of the appended claims and any equivalents thereto.

I claim:

1. A method for removing or controlling the spread of an oily contaminant from an aqueous environment comprising the step of contacting said oily contaminant with a structure comprising:

a plurality of sheets having major surfaces and edges comprising oleophilic and hydrophobic fibers, said sheets arranged in superposition to form a generally layered structure having one or more surfaces comprising sheets edges or folds, means for maintaining said sheets in said generally layered structure, said layered structure having a surface formed by said sheet folds or edges that is equal to or greater than the other surfaces of the layered structure, and maintaining said structure so that said oily contaminant contacts at least one said surface comprised of sheet ends or edges.

2. The method of claim 1 wherein said sheets have a basis weight in the range of from about 14 to about 140 gsm and comprise generally continuous filaments having an average diameter in the range of from about 10 to about 40 microns and formed from a thermoplastic polyolefin.

3. The method of claim 2 wherein said sheets are pattern bonded spunbond sheets and said thermoplastic polyolefin comprises polypropylene.

4. The method of claim 2 wherein said sheets form a continuous web folded in a serpentine manner.

5. The method of claim 2 wherein said sheets are bonded by a patterned application of heat and pressure and have a strip tensile of at least 0.5 Kg M-F in the weakest direction.

6. The method of claim 2 wherein said sheets have macropores formed within said sheets.

7. The method of claim 2 wherein said means for maintaining said sheets in said layered structure comprise a core through the sheets and a compression cap causing the sheet ends to flare in use.

8. The method of claim 2 including the additional step of combination of said structure with one or more other such structures as a catenated boom and spaced so that, in use, a generally continuous barrier is formed.

* * * * *

UNITED STATES PATENT AND TRADEMARK OFFICE
CERTIFICATE OF CORRECTION

PATENT NO. : 5,364,680

DATED : November 15, 1994

INVENTOR(S) : James D. Cotton

It is certified that error appears in the above-identified patent and that said Letters Patent is hereby corrected as shown below:

Column 2, line 2, "form, For" should read --form. For--;

Column 5, line 26, "U.S. Pat." should read --U.S. Design Pat.--.

Signed and Sealed this

Tenth Day of October, 1995

Attest:

BRUCE LEHMAN

Attesting Officer

Commissioner of Patents and Trademarks